United States Patent [19]
Eaton et al.

[11] Patent Number: 5,850,082
[45] Date of Patent: Dec. 15, 1998

[54] SYSTEM FOR COUNTING PERSONS IN A HIGH DENSITY MOBILE STORAGE SYSTEM

[75] Inventors: David R. Eaton, Lomira; Jeffrey W. Frank, Neosho, both of Wis.

[73] Assignee: Tab Products Company, Palo Alto, Calif.

[21] Appl. No.: 754,067

[22] Filed: Nov. 20, 1996

[51] Int. Cl.⁶ .............................. G01V 8/10; G01V 8/20; A47B 53/00
[52] U.S. Cl. ...................... 250/221; 250/338.1; 312/201
[58] Field of Search ............................... 250/221, 222.1, 250/338.1; 312/201, 198

[56] References Cited

U.S. PATENT DOCUMENTS

| | | | |
|---|---|---|---|
| 4,029,176 | 6/1977 | Mills | 187/317 |
| 4,437,711 | 3/1984 | Dahnert | 312/201 |
| 4,693,184 | 9/1987 | Peterman | 104/295 |
| 4,733,923 | 3/1988 | Dahnert | 312/201 |
| 4,743,078 | 5/1988 | Dahnert | 312/201 |
| 4,744,307 | 5/1988 | Peterman et al. | 104/295 |
| 4,745,516 | 5/1988 | Griffin | 312/201 |
| 4,759,592 | 7/1988 | Dahnert | 312/201 |
| 5,050,941 | 9/1991 | Dahnert et al. | 312/201 |
| 5,121,975 | 6/1992 | Dahnert | 312/201 |
| 5,160,190 | 11/1992 | Farrell et al. | 312/201 |
| 5,359,191 | 10/1994 | Griesemer et al. | 250/221 |
| 5,408,089 | 4/1995 | Bruno et al. | 250/221 |
| 5,417,487 | 5/1995 | Dahnert | 312/201 |
| 5,427,444 | 6/1995 | Griesemer | 312/201 |
| 5,670,778 | 9/1997 | Smith | 250/221 |

*Primary Examiner*—Edward P. Westin
*Assistant Examiner*—John R. Lee
*Attorney, Agent, or Firm*—Donald Cayen

[57] ABSTRACT

High density mobile storage comprising a mobile carriage between two stationary end shelving structures. Photoelectric light beam emitters and receivers are installed in the stationary structures. The light beams emitted pass through a passage in the mobile carriage and through the aisles between the mobile carriage and stationary structures. The passage in the mobile carriage is shielded to prevent interference with the light beams. The photoelectric emitters and receivers cooperate with a control to prevent rolling of the mobile carriage in response to sensing the presence of a person in any aisle, and to enable rolling of the mobile carriage in response to sensing the absence of persons in all aisles. The light beams are located to produce reliable sensing of persons entering and leaving the aisles.

13 Claims, 3 Drawing Sheets

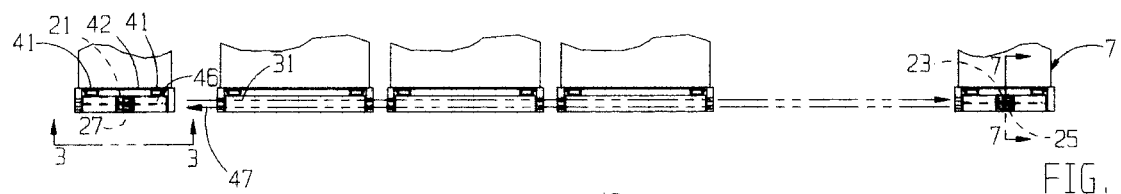
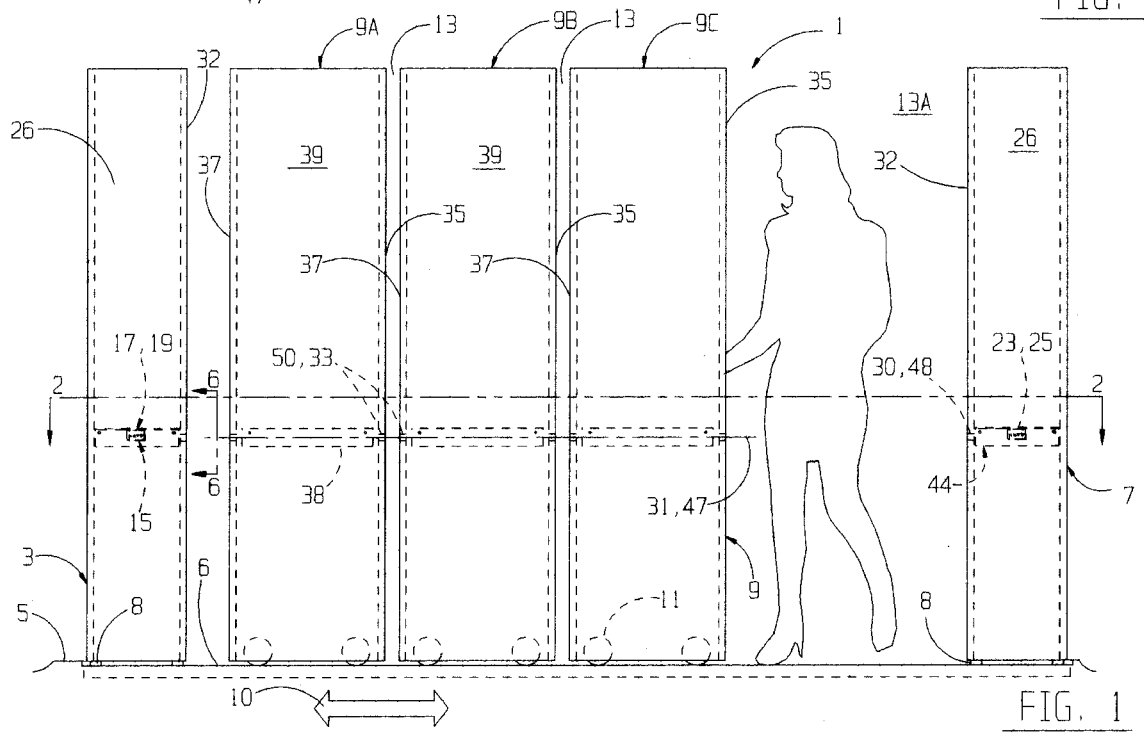

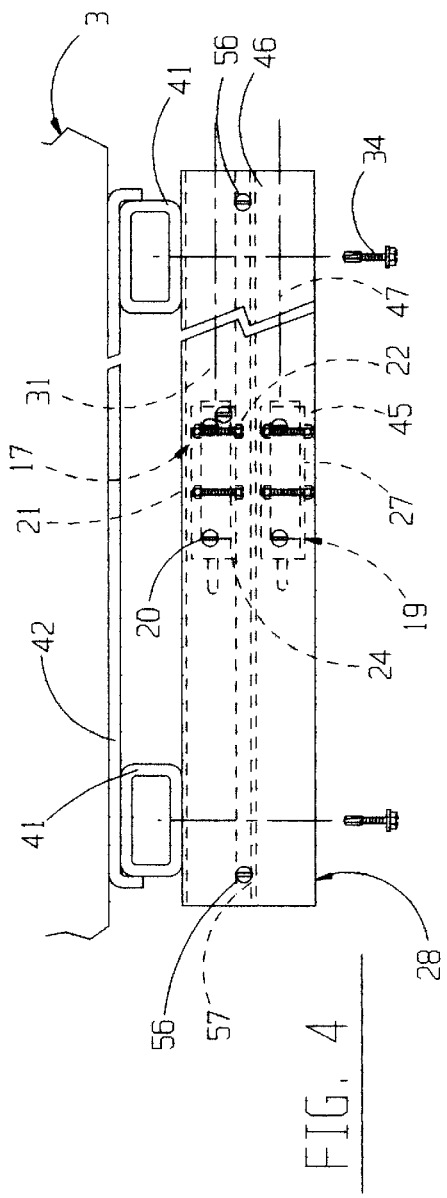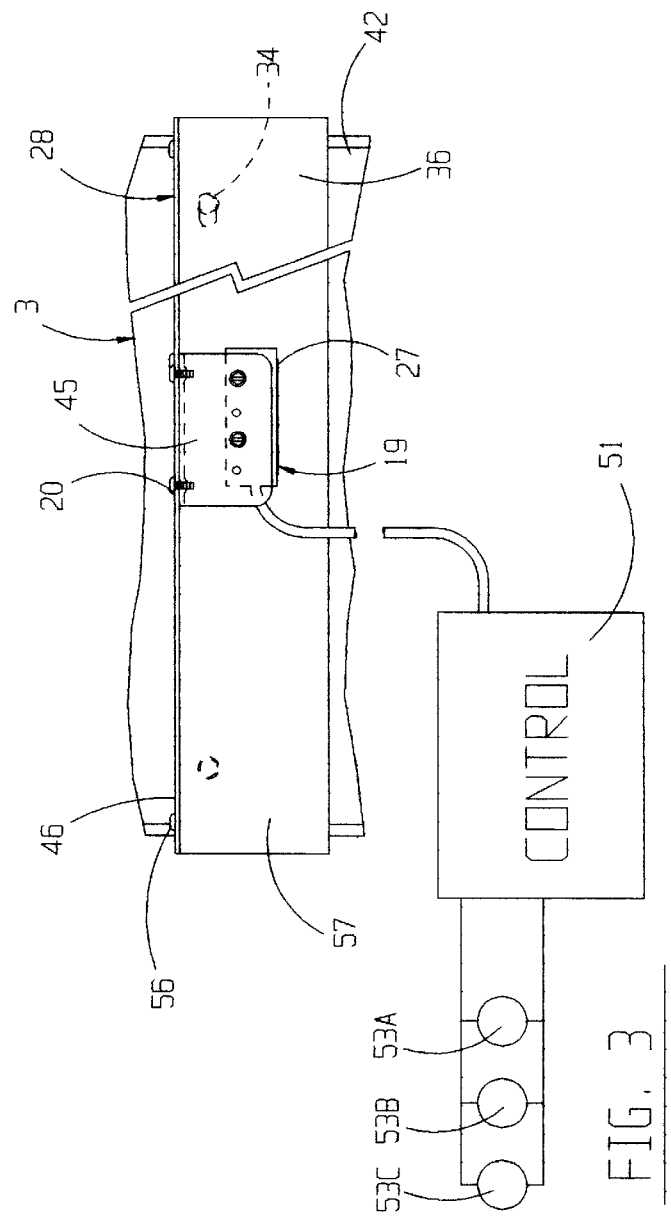

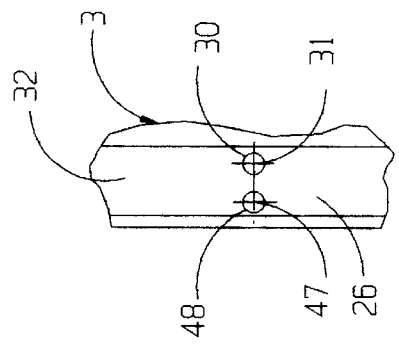
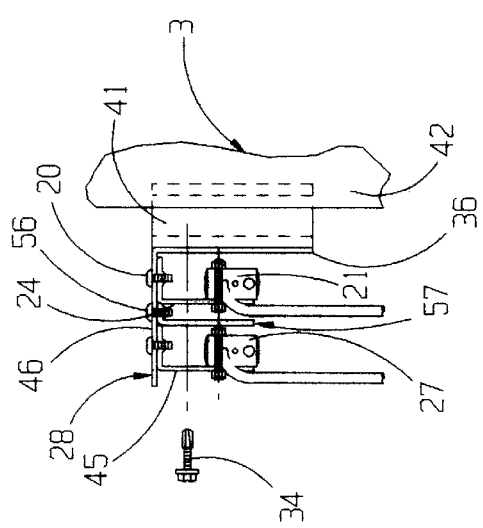
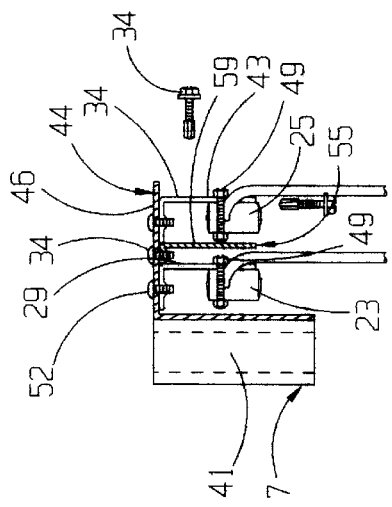

SYSTEM FOR COUNTING PERSONS IN A HIGH DENSITY MOBILE STORAGE SYSTEM

BACKGROUND OF THE INVENTION

1. Field of the Invention

This invention pertains to safety systems, and more particularly to apparatus for protecting persons using high density mobile storage.

2. Description of the Prior Art

The outstanding benefit of high density mobile storage is the capability of storing large quantities of books, files, and similar materials in a relatively small space. Consequently, high density mobile storage is well known and widely used in offices and libraries.

A typical high density mobile storage includes two stationary end shelving structures and one or more mobile carriages between the end structures. The mobile carriages are supported on wheels for rolling along tracks embedded in a building floor. Moving a carriage along the tracks away from or toward an adjacent carriage or end structure opens or closes, respectively, aisles adjacent the moving carriage.

Because of the large masses associated with mobile carriages, they are usually propelled by electric or mechanical-assist drives. In electric mobile carriages, electric motors drive the carriage wheels. Mechanical-assist mobile carriages employ a hand wheel and related mechanism that enable a person to move a carriage with minimal manual effort. Mechanical-assist mobile carriages sometimes employ electro-mechanical brakes that lock the carriages at desired locations along the tracks.

It is highly important that no person be in an aisle adjacent a mobile carriage when the carriage is moving to close an aisle. Accordingly, various safety features have been incorporated into high density mobile storage to detect the presence of a person in an aisle. For example, U.S. Pat. Nos. 4,733,923 and 4,743,078 show safety sweeps or switch bars. Safety floors are described in U.S. Pat. Nos. 4,693,184 and 4,744,307. U.S. Pat. No. 4,745,516 describes a combination safety floor and sweep. The devices of the foregoing patents possess the common characteristic of requiring a physical force to actuate them. In some instances, such physical force may be difficult to produce or to sense.

U.S. Pat. No. 5,417,487 employs a motion detector for each aisle of high density mobile storage. U.S. Pat. No. 5,160,190 also discloses high density mobile storage having a separate motion detector for each aisle. U.S. Pat. No. 4,029,176 describes an acoustic wave transmitter and receiver applied to elevator doors. The sensors of the three foregoing patents overcome the requirement of a physical force to actuate a safety device.

U.S. Pat. No. 5,121,975 shows a photoelectric sweep that can sense the presence of a person in an aisle. However, a moving carriage must roll quite close to a person in the aisle before the person's presence is detected.

U.S. Pat. No. 5,359,191 discloses a cross-aisle photodetector that senses the presence of a person or object resting on the floor in an aisle. U.S. Pat. No. 5,427,444 describes a mobile storage system in which photoelectric motion sensors count persons as they enter and leave the aisles. In the U.S. Pat. Nos. 5,359,191 and 5,427,444, separate sensors are installed to monitor each aisle individually. Each mobile carriage, therefore, has two sets of sensors and controls, one for each aisle on the opposite sides of the carriage. The resulting high cost is undesirable. Another drawback of the sensor of the U.S. Pat. No. 5,427,444 is that it is located so as to give potentially erroneous signals. That is because the sensor senses a person near his knees or feet. If a tall person enters or leaves an aisle, it is possible for the motion sensor to sense his knees or feet individually and thus produce a wrong count.

Thus, a need exists for further improvements in high density mobile storage.

SUMMARY OF THE INVENTION

In accordance with the present invention, an inexpensive but reliable system for counting persons is incorporated into high density mobile storage. This is accomplished by apparatus that includes dual photoelectric sensing units installed only in the stationary end shelving structures of the mobile storage.

Each photoelectric sensing unit contains an infrared light emitter and an infrared light receiver. The light emitter of one sensing unit is installed in one stationary shelving structure. The light receiver of that sensing unit is installed in the other stationary structure and is positioned to receive the light beam emitted by the emitter. The emitter and receiver are positioned close to the ends of the stationary structures. To enable the light beam to extend between the stationary structures, passages are provided in all the mobile carriages that roll between the stationary structures. The light beam passes through the mobile carriages between the emitter and receiver.

The infrared light emitter and receiver of the second sensing unit are located a short distance horizontally from the emitter and receiver of the first sensing unit such that the two infrared light beams are parallel, spaced apart horizontally, and preferably equidistant from the building floor. To prevent interference with the light beams by wires or other components inside the mobile carriages, a shield is erected around the passages.

If the high density mobile storage provides access to the aisles from both ends of the stationary shelving structures and the mobile carriages, duplicate photoelectric sensing units are installed in both ends of the stationary structures. Duplicate light beam passages are then also provided in the mobile carriages.

The photoelectric sensing units are wired to a control that senses the presence or absence of persons in the aisles. Persons walking into any open aisle break first one light beam and then the other in sequence. Because the two beams are close together horizontally, the beams are also interrupted simultaneously for a short time as the person walks into the aisle. The sequential-simultaneous beam interruptions trigger the control to count the number of persons entering all the aisles.

A person leaving any aisle breaks both beams in a reverse sequence. The control is thus triggered to count the number of persons leaving all the aisles. The count is greater than zero as long as one or more person is present in any aisle. When the number of persons who have left all aisles equals the number of persons who entered all aisles, the control enables the mobile carriages to be moved.

Further in accordance with the present invention, the dual photoelectric sensing units are installed at a location above the building floor that provides reliable operation of the safety system. That location is within the range of the locations of the upper thigh to lower torso of average height persons. By installing the photoelectric emitters and receivers at that vertical location, the system provides an accurate count of the number of persons entering and leaving the aisles.

The method and apparatus of the invention, using dual photoelectric sensing units installed in stationary end shelving structures, thus tests the number of persons within all the aisles of high density mobile storage. The possibility of a mobile carriage moving when a person is present in an aisle is very remote, even though the person could be in any of the aisles.

Other advantages, benefits, and features of the present invention will become apparent to those skilled in the art upon reading the detailed description of the invention.

BRIEF DESCRIPTION OF THE DRAWINGS

FIG. 1 is an end view of a typical high density mobile storage that employs the system for counting persons of the present invention.

FIG. 2 is a partial cross sectional view taken along line 2—2 of FIG. 1.

FIG. 3 is a view on an enlarged scale taken along line 3—3 of FIG. 2, but showing the end cover of the stationary shelving structure removed and also showing the control of the present invention in schematic form.

FIG. 4 is a top view of FIG. 3.

FIG. 5 is an end view of FIG. 3.

FIG. 6 is a view on an enlarged scale taken along line 6—6 of FIG. 1.

FIG. 7 is a cross sectional view taken along line 7—7 of FIG. 2 and rotated 90 degrees counterclockwise.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 1 and 2, typical high density mobile storage 1 is illustrated that includes the present invention. The high density mobile storage 1 includes a first end shelving structure 3 that is stationarily anchored to the floor 5 of a building. Two or more parallel tracks 6 are embedded in the building floor 5 and extend from under the first stationary structure 3 to under a similar second stationary end structure 7. The tracks 6 support pads 8 under the end structures 3 and 7 and also suitable wheels 11 of one or more mobile carriages 9. The wheels 11 enable the mobile carriage 9 to roll in the longitudinal directions of arrows 10. In the particular high density mobile storage illustrated, there are three mobile carriages 9A, 9B, and 9C. However, it will be appreciated that more or fewer than three mobile carriages can be used. The stationary structures 3 and 7 and the mobile carriages 9 are constructed with shelves, bins, or the like, not illustrated in the drawings, for storing books, files, and similar items.

Rolling the mobile carriages 9 along the tracks 6 has the effect of opening and closing aisles 13 between them and adjacent stationary shelving structures 3 and 7. For example, in FIG. 1 an aisle 13A is open between the mobile carriage 9C and the second stationary structure 7. Persons can enter the open aisle 13A to obtain access to the contents of the carriage 9C and of the stationary structure 7.

The mobile carriages 9 are propelled along the tracks 6 by either electric motors and their controls, or by mechanical-assist drives, both of which are well known in the art. In high density mobile storage with mechanical-assist drives for the mobile carriages, an electro-mechanical brake is associated with at least one wheel 11 of each carriage.

In accordance with the present invention, operation of the high density mobile storage 1 is governed by a system 15 for counting the number of persons in the various aisles 13 for all relative positions of the mobile carriages 9. Particularly, if a person is within any aisle of the high density mobile storage, none of the mobile carriages is able to roll along the tracks 6.

The system 15 for counting persons in the aisles 13 is comprised of first and second photoelectric sensing units 17 and 19, respectively. Also looking at FIGS. 3–6, the first photoelectric sensing unit 17 includes an infrared light emitter 21 that is installed in the first stationary shelving structure 3 by a mounting bracket 24 and a mounting angle 28. A vertical leg 36 of the mounting angle 28 is fastened by screws 34 to two short tubes 41. In turn, the tubes 41 are attached to a long vertically extending channel 42 on the end of the stationary structure. The mounting bracket 24 is secured by fasteners 20 to a horizontal leg 46 of the mounting angle. The mounting of the infrared light emitter 21 to the mounting bracket is slightly adjustable by means of the fasteners 22 between the emitter and the mounting bracket. Accordingly, the emitter is adjustable in a vertical plane by the fasteners 22. Similarly, the fasteners 20 between the mounting bracket and the mounting angle enable adjustments of the mounting bracket, and thus the emitter, in a horizontal plane.

A matching infrared light receiver 23 is installed in the second stationary shelving structure 7 by another mounting bracket 29 and mounting angle 44, FIG. 7. The receiver 23 is adjustable in a vertical plane by means of fasteners 49 between the receiver and the mounting bracket 29, and in a horizontal plane by fasteners 52 between the mounting bracket and the mounting angle 44. The emitter 21 and receiver 23 are thus alignable with each other such that a light beam 31 emitted from the emitter is receivable by the receiver.

There is a hole 30 in the face 32 of the end cover 26 of each stationary shelving structure 3 and 7. The holes 30 are concentric with the light beam 31.

To enable the light beam 31 emitted by the emitter 21 to be received by the receiver 23, there is a passage concentric with the light beam in each mobile carriage 9. The passage in each mobile carriage is in the form of a hole 33 in each of the front faces 35, 37 of the end cover 39 of the mobile carriage. A shield 38 is fastened inside each mobile carriage between the holes 33. In the illustrated construction, the shield 38 is in the same form as the mounting angles 28 and 44 used in the stationary shelving structures 3 and 7, respectively. The shields 38 extend between the front faces 35, 37 of each mobile carriage. The light beam passes under the horizontal legs of the shields, so the shields prevent wires and other components inside the mobile carriage from interfering with the light beam.

The second photoelectric sensing unit 19 includes an infrared light emitter 25 installed in the second stationary shelving structure 7 by a mounting bracket 43, and an infrared light receiver 27 installed in the first stationary structure 3 by a mounting bracket 45. The mounting brackets 43 and 45 are secured to the horizontal legs 46 of the mounting angles 44 and 28, respectively, in the two stationary structures. A light beam 47 from the emitter 25 to the receiver 27 passes through holes 48 in the stationary structure end covers 26. The photoelectric sensing units 17 and 19 are arranged such that their light beams 31 and 47, respectively, are spaced apart transversely and are at equal distances above the floor 5.

To prevent the possibility that the light beam 47 might reflect back to the infrared light receiver 23, a long divider 55 is fastened with screws 56 to the mounting angle 44. The divider 55 has a vertical plate 59 that is placed between the light emitter 25 and the light receiver 23. A similar divider 57 is fastened to the mounting angle 28 in the stationary structure 3. The light beam 47 also passes through holes 50 in the mobile carriage end covers 39. The shields 38 in the mobile carriages 9 prevent interference with the light beam 47 by wires and other components inside the mobile carriages.

If access to the aisles 13 of the high density mobile storage 1 is available from both ends of the stationary shelving structures 3, 7 and the mobile carriages 9, the photoelectric sensing units 17 and 19 are duplicated at the corresponding ends opposite the end covers 39 and 26.

The photoelectric sensing units 17 and 19 are wired to a control 51. The control 51 includes a counting system that is triggered by the breaking of the light beams 31, 47. When a person enters any open aisle 13A, the beam 47 is broken first, and then beam 31 is broken. The transverse spacing between the light beams is sufficiently small to assure that both beams are also simultaneously broken by the person's body as he walks past the beams. The combination sequential-simultaneous breaking of the beams triggers the control to count up from zero to one, if all the aisles 13 had been empty previously. Entry of additional persons into any open aisle causes further counts up equal to the number of entering persons.

When a person walks out of an aisle 13, the beam 31 is broken before the beam 47. That sequence of breakage of the beams triggers the control 51 to count down by one. The control interprets any count greater than zero as the presence of a person within any aisle. Only when the count has returned to zero because all persons have left all the aisles of the high density mobile storage 1 does the control sense the absence of persons within the aisles. Then the control will enable any mobile carriage 9 to roll. In high density mobile storage with mechanical-assist mobile carriages, an electro-mechanical brake 53A, 53B, 53C may be assembled with the wheels 11 of the associated mobile carriages 9A, 9B, 9C, respectively. In that situation, the brakes 53A, 53B, 53C are controlled by the control so as to enable rolling of the mobile carriages only when the control count is zero.

It is a feature of the present invention that the light beams 31, 47 are sufficiently high off the floor 5 so as to be broken by the upper thigh or lower torso of a person. A lower placement of the beams could give a false count to the control 51 by counting each of the legs or feet of a person as he enters or leaves an aisle. We have found that a height of approximately 30 inches above the floor 5 gives reliable operation of the system 15 for counting persons.

In summary, the results and advantages of high density mobile storage can now be more fully realized. The system 15 for counting persons counts all persons within all aisles 13 between two stationary end shelving structures 3 and 7. This desirable result comes from using two photoelectric sensing units 17 and 19 mounted to the stationary structures. Light beams 31, 47 between the infrared emitters 21, 25 and receivers 23, 27 of the photoelectric sensing units pass through the mobile carriages 9. Breaking the light beams because a person walks into or out of any aisle triggers the control 51 to either enable or prevent rolling of the mobile carriages. Shields 38 inside the mobile carriages prevent carriage components from interfering with the light beams. Dividers 55 and 57 in the stationary shelving structures prevent the light beams from interfering with each other. On mobile carriages with mechanical-assist, electromechanical brakes 53 prevent rolling of the mobile carriages when a person is present in any aisle.

It will also be recognized that in addition to the superior performance of the system 15 for counting persons, its construction is such as to significantly reduce the cost of manufacturer as compared with traditional photoelectric sensing systems used in high density mobile storage. Also, because the number of sensing and control components is greatly reduced, the need for maintenance is also substantially decreased.

Thus, it is apparent that there has been provided, in accordance with the invention, a system for counting persons that fully satisfies the aims and advantages set forth above. While the invention has been described in conjunction with specific embodiments thereof, it is evident that many alternatives, modifications, and variations will be apparent to those skilled in the art in light of the foregoing description. For example, in some high density mobile storage, one or even both stationary end shelving structures 3, 7 may be eliminated. In that situation, the photoelectric sensing units 17 and 19 can be mounted to a building wall or other permanent framework. Accordingly, it is intended to embrace all such alternatives, modifications, and variations as fall within the spirit and broad scope of the appended claims.

We claim:

1. High density mobile storage comprising:
   a. a pair of spaced apart stationary end shelving structures anchored to the building floor and having opposed first and second ends;
   b. at least one mobile carriage between the stationary structures and having opposed ends that are generally coplanar with the respective ends of the stationary structures;
   c. power means or selectively rolling the mobile carriage toward and away from the stationary structures to thereby open and close aisles adjacent to mobile carriage;
   d. photoelectric means installed in the stationary structures solely proximate at least the respective first ends thereof for emitting and receiving at least two infrared light beams;
   e. passage means through each mobile carriage proximate an end thereof for enabling the infrared light beams to extend between the stationary structure; and
   f. control means for cooperating with the photoelectric means to count the number of persons entering and leaving all the aisles.

2. The high density mobile storage of claim 1 wherein:
   a. the power means comprises:
      i. mechanical assist means for manually rolling each mobile carriage; and
      ii. an electro-mechanical brake associated with the mechanical assist means on each mobile carriage; and
   b. the control means controls each electro-mechanical brake to prevent rolling of any mobile carriage in response to the counting of a person present in any aisle by the cooperation of the photoelectric means and the control means.

3. The high density mobile storage of claim 1 wherein:
a. each stationary structure comprises an end cover having a face, the face defining first and second horizontally spaced holes therethrough;
b. the photoelectric means comprises first and second infrared light emitters that emit first and second infrared light beams through the first and second holes, respectively, in the end covers of the stationary structures, and first and second infrared light receivers that receive the first and second infrared light beams from the respective infrared light emitters; and
c. the passage means through each mobile carriage comprises:
 i. an end cover with opposed front faces, each end cover front face defining first and second holes therethrough concentric with the respective infrared light beams that enable the beams to pass through the mobile carriage and thereby extend between the stationary structures; and
 ii. shield means for preventing interference with the infrared light beams passing through the mobile carriage by components inside the mobile carriage.

4. The high density mobile storage of claim 3 wherein the shield means comprises a mounting angle having a vertical leg fastened to the mobile carriage and a horizontal leg, the light beams passing under the mounting angle horizontal leg.

5. The high density mobile storage of claim 1 wherein the infrared light beams are located approximately 30 inches above the building floor.

6. Apparatus for storing selective material comprising:
a. first and second stationary spaced apart structures anchored to a building floor and having respective opposed first and second ends;
b. carriage means for storing the selecting materials and for rolling along the building floor between the stationary structures and thereby cooperating therewith to open and close multiple aisles, the carriage means defining a plurality of passages therethrough; and
c. photoelectric means installed solely in the stationary structures for counting the number of persons in all of the aisles, the photoelectric means comprising at least one light beam emitter installed in each stationary structure proximate the first end thereof, and at least one light beam receiver installed in each stationary structure that receives the light beam that is emitted by an associated light beam emitter and that passes through a respective passage in the carriage means.

7. The apparatus of claim 6 wherein:
a. the carriage means comprises at least one mobile carriage having an end cover; and
b. the plurality of passage of each mobile carriage are defined by a plurality of holes through the end covers that are concentric with the respective light beams emitted by the light beam emitters,
 so that the light beams pass through the end covers of each mobile carriage and thereby enable the light beam receivers to receive the light beams from the light beam emitters.

8. The apparatus of claim 7 wherein the passages in each mobile carriage are partially defined by shield means for protecting the light beams from interference with selected components inside the carriage.

9. The apparatus of claim 6 wherein the light beams emitted by the photoelectric light beam emitters are parallel to and approximately 30 inches above the building floor,
 so that the light beam strikes the upper thigh or lower torso of a person walking into or out of an aisle.

10. A method of controlling high density mobile storage comprising the steps of:
a. installing at least two photoelectric light beam emitters solely proximate an end of selected ones of a first stationary structure and a second stationary structure;
b. installing at least two photoelectric light beam receivers on the second stationary structures other than the selected ones of the first and second stationary structures;
c. providing a mobile carriage between the first and second stationary structures, the mobile carriage having opposed ends and cooperating with the stationary structures to define aisles therebetween;
d. passing a pair of light beams emitted by the photoelectric emitters through the mobile carriage solely proximate an end thereof, and receiving the light beams by the photoelectric receivers;
e. sequentially breaking the light beams emitted by the photoelectric emitters to count a person entering or leaving any aisle; and
f. controlling the mobile carriage to roll toward and away from the first and second stationary structures in response to counting no person in any aisle.

11. The method of claim 10 comprising the further step of shielding the light beam as it passes through the mobile carriage from interference by components inside the mobile carriage.

12. The method of claim 10 wherein the step of installing the photoelectric light beam emitters in the selected ones of the first and second stationary structures comprises the step of installing the photoelectric light beam emitters at a height such that the light beams strike the upper thigh or lower torso of a person entering or leaving any aisle.

13. The method of claim 10 wherein:
a. the step of providing a mobile carriage comprises the step of providing a brake on the mobile carriage; and
b. the step of controlling the mobile carriage comprises the step of actuating the brake to prevent rolling of the mobile carriage in response to counting at least one person in any aisle, and releasing the brake to enable rolling of the mobile carriage in response to counting no persons in any aisle.

* * * * *